(12) United States Patent
Kumar et al.

(10) Patent No.: US 12,114,254 B2
(45) Date of Patent: Oct. 8, 2024

(54) METHOD AND APPARATUS FOR MANAGING MT-SERVICE INFORMATION

(71) Applicant: Samsung Electronics Co., Ltd., Suwon-si (KR)

(72) Inventors: Lalith Kumar, Bengaluru (IN); Hoyeon Lee, Suwon-si (KR); Erik Arthur Guttman, Baden-Württemberg (DE)

(73) Assignee: Samsung Electronics Co., Ltd., Suwon-si (KR)

( * ) Notice: Subject to any disclaimer, the term of this patent is extended or adjusted under 35 U.S.C. 154(b) by 234 days.

(21) Appl. No.: 17/628,172

(22) PCT Filed: Jul. 17, 2020

(86) PCT No.: PCT/KR2020/009456
§ 371 (c)(1),
(2) Date: Jan. 18, 2022

(87) PCT Pub. No.: WO2021/015502
PCT Pub. Date: Jan. 28, 2021

(65) Prior Publication Data
US 2022/0286950 A1    Sep. 8, 2022

(30) Foreign Application Priority Data

Jul. 19, 2019  (IN) .............................. 201941029296
Jul. 14, 2020  (IN) .............................. 201941029296

(51) Int. Cl.
H04W 48/18    (2009.01)
H04W 8/18     (2009.01)
(Continued)

(52) U.S. Cl.
CPC .......... *H04W 48/18* (2013.01); *H04W 8/183* (2013.01); *H04W 60/005* (2013.01); *H04W 68/005* (2013.01); *H04W 76/20* (2018.02)

(58) Field of Classification Search
None
See application file for complete search history.

(56) References Cited

U.S. PATENT DOCUMENTS

2016/0262200 A1   9/2016  Su
2016/0345245 A1   11/2016 Chuttani et al.
(Continued)

FOREIGN PATENT DOCUMENTS

EP    3 591 948 A1     8/2020
WO    2018/171012 A1   9/2018
(Continued)

OTHER PUBLICATIONS

Samsung, "N3GPPA and MUSIM study", 3GPP TSG SA Meeting #135, Oct. 14-18, 2019, S2-1909686, 2 pages.
(Continued)

*Primary Examiner* — Alpus Hsu
*Assistant Examiner* — Camquyen Thai

(57) ABSTRACT

A method for managing mobile terminated (MT)-service information to a multi-subscriber identity module (SIM) user equipment (UE) over non-3rd generation partnership project (N3GPP) access in a wireless communication network is provided. The method includes determining, by the multi-SIM UE, an on-going service on a first SIM of the multi-SIM UE over a 3GPP access; and managing, by the multi-SIM UE, the MT-service information for a second SIM of the multi-SIM UE using the N3GPP access based on the on-going service on the 3GPP access of the first SIM of the multi-SIM UE.

12 Claims, 11 Drawing Sheets

(51) Int. Cl.
*H04W 60/00* (2009.01)
*H04W 68/00* (2009.01)
*H04W 76/20* (2018.01)

(56) References Cited

U.S. PATENT DOCUMENTS

| | | | |
|---|---|---|---|
| 2016/0353449 A1 | 12/2016 | Chuttani et al. | |
| 2019/0007500 A1* | 1/2019 | Kim | H04L 67/141 |
| 2019/0349849 A1* | 11/2019 | Kavuri | H04W 36/0022 |
| 2020/0245292 A1 | 7/2020 | Huang et al. | |
| 2020/0396591 A1* | 12/2020 | Ou | H04W 24/08 |
| 2022/0240213 A1* | 7/2022 | Ly | H04W 60/04 |
| 2022/0330202 A1 | 10/2022 | Kumar et al. | |

FOREIGN PATENT DOCUMENTS

| | | |
|---|---|---|
| WO | 2018203713 A1 | 11/2018 |
| WO | 2020071536 A1 | 4/2020 |
| WO | 2020/222531 A1 | 11/2020 |
| WO | 2021/020855 A1 | 2/2021 |
| WO | 2021/066562 A1 | 4/2021 |
| WO | 2022/005168 A1 | 1/2022 |

OTHER PUBLICATIONS

Supplementary European Search Report dated Dec. 22, 2022 in connection with European Patent Application No. 20 84 4660, 19 pages.
International Search Report and Written Opinion of the International Searching Authority dated Oct. 21, 2020, in connection with International Application No. PCT/KR2020/009456, 9 pages.
Vivo, et al., "New Rel-17 SID proposal: Study on multi-SIM devices in RAN," RP-190282, 3GPP TSG RAN Meeting #83, Shenzhen, China, Mar. 18-21, 2019, 4 pages.
China Telecom, et al., "Motivation for SI on multi-SIM devices in RAN," RP-190248, 3GPP TSG RAN Meeting #83, Shenzhen, China, Mar. 18-21, 2019, 3 pages.
Notice of grounds for rejection dated Jun. 25, 2024, in connection with Japanese Patent Application No. 2022-503841, 14 pages.
3GPP TS 24.501 V16.1.0 (Jun. 2019). Technical Specification, 3rd Generation Partnership Project; Technical Specification Group Core Network and Terminals; Non-Access-Stratum (NAS) protocol for 5G System (5GS); Stage 3 (Release 16), Jun. 2019, 541 pages.

* cited by examiner

METHOD AND APPARATUS FOR MANAGING MT-SERVICE INFORMATION

CROSS-REFERENCE TO RELATED APPLICATIONS

This application is a 371 National Stage of International Application No. PCT/KR2020/009456, filed Jul. 17, 2020, which claims priority to Indian Patent Application No. 201941029296, filed Jul. 19, 2019, and Indian Patent Application No. 201941029296, filed Jul. 14, 2020, the disclosures of which are herein incorporated by reference in their entirety.

BACKGROUND

1. Field

The present disclosure relates to wireless communication, and more particularly, the present disclosure relates to method and a multi-subscriber identity module (SIM) user equipment (UE) for managing mobile terminated (MT)-service information over non-3rd generation partnership project (N3GPP) access in a wireless communication network.

2. Description of Related Art

To meet the demand due to ever-increasing wireless data traffic after the commercialization of the 4th generation (4G) communication system, there have been efforts to develop an advanced 5th generation (5G) system or pre-5G communication system. For this reason, the 5G or pre-5G communication system is also called a beyond 4th-generation (4G) network communication system or post long term evolution (LTE) system. Implementation of the 5G communication system using ultra-frequency millimeter wave (mmWave) bands, e.g., 60 giga hertz (GHz) bands, is considered to attain higher data transfer rates. To reduce propagation loss of radio waves and increase a transmission range in the ultra-frequency bands, beamforming, massive multiple-input multiple-output (MIMO), Full Dimensional MIMO (FD-MIMO), array antenna, analog beamforming, and large-scale antenna techniques are under discussion. To improve system networks, technologies for advanced small cells, cloud Radio Access Networks (RANs), ultra-dense networks, device to device (D2D) communication, wireless backhaul, moving networks, cooperative communication, Coordinated Multi-Points (CoMP), reception-end interference cancellation and the like are also being developed in the 5G communication system. In addition, in the 5G system, an advanced coding modulation (ACM), e.g., hybrid frequency-shift keying (FSK) and quadrature amplitude modulation (QAM) (FQAM), sliding window superposition coding (SWSC), and an advanced access technology, e.g., filter bank multi carrier (FBMC), non-orthogonal multiple access (NOMA), and sparse code multiple access (SCMA), are being developed.

In the meantime, the Internet is evolving from a human-centered connectivity network where humans generate and consume information into an Internet of Things (IoT) network where distributed entities such as things transmit, receive and process information without human intervention. Internet of Everything (IoE) technologies combined with IoT, such as big data processing technologies through connection with a cloud server, for example, have also emerged. To implement IoT, various technologies, such as a sensing technology, a wired/wireless communication and network infrastructure, a service interfacing technology, and a security technology are required, and recently, even technologies for sensor network, Machine to Machine (M2M), Machine Type Communication (MTC) for connection between things are being studied. Such an IoT environment may provide intelligent Internet Technology (IT) services that generate a new value to human life by collecting and analyzing data generated among connected things. IoT may be applied to a variety of areas, such as smart homes, smart buildings, smart cities, smart cars or connected cars, smart grids, health care, smart home appliances and advanced medical services through convergence and combination between existing Information Technologies (IT) and various industrial applications.

In this regard, various attempts to apply the 5G communication system to the IoT network are being made. For example, technologies regarding a sensor network, M2M, MTC, etc., are implemented by the 5G communication technologies, such as beamforming, MIMO, array antenna schemes, etc. Even application of a cloud Radio Access Network (cloud RAN) as the aforementioned big data processing technology may be viewed as an example of convergence of 5G and IoT technologies.

Generally, with advancement in technology, multi-subscriber identity module (SIM) user equipments (UEs) are widely used to obtain benefit of services from various operators. Consider a multi-SIM user equipment (UE) having a single receiver and a transmitter or the multi-SIM UE having a dual receiver and a single transmitter. The multi-SIM UE is in connected mode using services on a first SIM of the multi-SIM UE over the 3GPP access. The multi-SIM UE receives paging from network for a second SIM. The multi-SIM UE does not have knowledge of what kind of service is pending for the second SIM. Thus, the multi-SIM UE responds to paging over the 3GPP access and gets into connected mode over the 3GPP access by discontinuing the service ongoing on the first SIM. After getting into the connected mode, the multi-SIM UE realizes the service on the second SIM is not a priority one compared to the service which was ongoing on the first SIM. Thus the multi-SIM UE will have to abandon the service on the second SIM and fallback to service on the first SIM over the 3GPP access. This will have a considerable impact on the service (for example reduced throughput) on the first SIM on UE side. At the same time network will face considerable resources wastage.

Further, as services are ongoing on the first SIM, the multi-SIM UE may not be able to read the paging in case of the multi-SIM UE having one receiver and one transmitter even if say the multi-SIM UE is having two receivers and reads the paging message, the multi-SIM UE will not be capable of responding to the paging message over the 3GPP access as it is having only one transmitter. This will have considerable impact on the network resources, as network is paging the multi-SIM UE and the multi-SIM UE is not able to respond to the paging message.

Thus, it is desired to address the above mentioned disadvantages or other shortcomings or at least provide a useful alternative.

SUMMARY

The present disclosure relates to a method for managing mobile terminated (MT)-service information over non-3rd generation partnership project (N3GPP) access in a wireless communication network.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1:
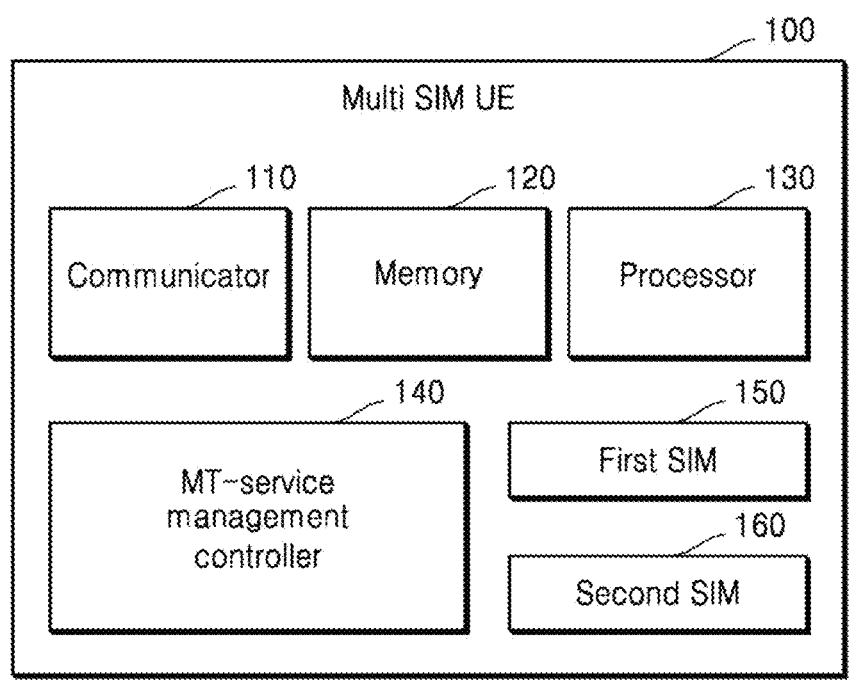
FIG. 1 is a block diagram of the multi-SIM UE 100 for managing MT-service information over N3GPP access in a wireless communication network, according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The proposed method is trying to utilize an alternate path of reaching the multi-SIM UE using non 3GPP access. The Access and Mobility Management Function (AMF) will service both the 3GPP access (3GPPA) and the non-3GPP Access (N3GPPA) in a same public land mobile network (PLMN). i.e. when the UE is registered with same PLMN and onto both 3GPPA and N3GPPA. Then if AMF receives downlink data for the 3GPP access, notification message or Non-access stratum (NAS) message from the AMF can be sent over the N3GPPA (example Wifi Access) to the multi-SIM UE 100 when the N3GPPA CM state is 5GMM_REGISTERED and CM_CONNECTED over the N3GPP access and CM state is IDLE over the 3GPPA. This alternate path of reaching the multi-SIM UE is explored in this invention to solve the above issue related to wastage of network resources over the 3GPP access and increase a throughput of the multi-SIM UE.

The principal object of the embodiments herein is to provide a method and a multi-subscriber identity module (SIM) user equipment (UE) for managing mobile terminated (MT)-service information over non-3rd generation partnership project (N3GPP) access in a wireless communication network.

Another object of the embodiments herein is to determine an on-going service on a first SIM of the multi-SIM UE over a 3GPP access.

Another object of the embodiments herein is to determine whether a priority of a type of service pending for the second SIM over 3GPP access is higher than the priority of an on-going service on the first SIM.

Another object of the embodiments herein is to manage the MT-service information for a second SIM of the multi-SIM UE using the N3GPP access based on the on-going service on the 3GPP access of a first SIM of the multi-SIM UE.

Another object of the embodiments herein is to send a NOTIFICATION RESPONSE message to an AMF controller over the N3GPP access indicating that the multi-SIM UE is not intending to respond to a NOTIFICATION message for the second SIM when the priority of the type of service pending for the second SIM over 3GPP access is not higher than the priority of the on-going service on the first SIM over the 3GPP access.

Another object of the embodiments herein is to automatically send a NAS message with paging filtering rules to the AMF controller of the second SIM of the multi-SIM UE over the N3GPP access.

Accordingly the embodiments herein disclose a method for managing mobile terminated (MT)-service information to a multi-subscriber identity module (SIM) user equipment (UE) 100 over non-3rd generation partnership project (N3GPP) access in a wireless communication network. The method includes determining, by the multi-SIM UE 100, an on-going service on a first SIM 150 of the multi-SIM UE 100 over a 3GPP access; and managing, by the multi-SIM UE 100, the MT-service information for a second SIM 160 of the multi-SIM UE 100 using the N3GPP access based on the on-going service on the 3GPP access of the first SIM 150 of the multi-SIM UE 100.

In an embodiment, managing, by the multi-SIM UE 100, the MT-service information for the second SIM 160 of the multi-SIM UE 100 using the N3GPP access based on the on-going service on the 3GPP access of the first SIM 150 of the multi-SIM UE 100 includes receiving, by the multi-SIM UE 100, a NOTIFICATION message from an AMF controller of the second SIM 160 of the multi-SIM UE 100 over the N3GPP access for initiating a MT service on the second SIM 160 over the 3GPP access. The NOTIFICATION message comprises information of a type of MT service to be initiated over the second SIM 160 over the 3GPP access. Further, the method includes determining, by the multi-SIM UE 100, a priority of the type of service to be initiated over the 3GPP access of the second SIM 160 and a priority of the on-going service on the first SIM 150 over the 3GPP access and determining, by the multi-SIM UE 100, whether the priority of the type of service pending for the second SIM 160 over 3GPP access is higher than the priority of the on-going service on the first SIM 150. Furthermore, the method includes performing, by the multi-SIM UE 100, one of: triggering a service request or a registration request for the second SIM 160 with the AMF controller over a 3GPP access and moving to a connected mode over the second SIM 160, in response to determining that the priority of the type of service pending for the second SIM 160 over 3GPP access is higher than the priority of the on-going service on the first SIM 150 over the 3GPP access, and sending a NOTIFICATION RESPONSE message to the AMF controller over the N3GPP access indicating that the multi-SIM UE 100 is not intending to respond to the NOTIFICATION message for the second SIM 160, in response to determining that the priority of the type of service pending for the second SIM 160 over 3GPP access is not higher than the priority of the on-going service on the first SIM 150 over the 3GPP access.

In an embodiment, the second SIM 160 of the multi-SIM UE 100 is in CM-CONNECTED state for the N3GPP access and CM-IDLE for the 3GPP access.

In an embodiment, the type of service is indicated using one of a mobile terminated (MT) cause and a paging cause.

In an embodiment, managing, by the multi-SIM UE 100, the MT-service information for the second SIM 160 of the multi-SIM UE 100 using the N3GPP access based on the on-going service on the first SIM 150 of the multi-SIM UE 100 includes automatically sending, by the multi-SIM UE 100, a NAS message with paging filtering rules to the AMF controller of the second SIM 160 of the multi-SIM UE 100 over the N3GPP access.

In an embodiment, the paging filtering rules comprises at least one of a reject cause value, a timer value, a list of services for which the multi-SIM UE 100 wishes to receive paging over the 3GPP access, a list of services for which the multi-SIM UE 100 wishes to receive notification over the non-N3GPP access, a list of paging cause and services for which the multi-SIM UE 100 does not wish to receive paging over the 3GPPA, a list of paging cause and services for which the multi-SIM UE 100 does not wish to receive the notification over the N3GPPA.

In an embodiment, the paging filtering rules is determined based on the on-going service on the first SIM 150 of the multi-SIM UE 100.

Accordingly the embodiments herein disclose a multi-SIM UE 100 for managing mobile terminated (MT)-service information over non-3rd generation partnership project (N3GPP) access in a wireless communication network, the multi-SIM UE 100. The multi-SIM UE 100 includes a communicator 110, a memory 120, a processor 130 and a MT-service management controller 140. The MT-service management controller 140 is configured to determine an on-going service on a first SIM 150 of the multi-SIM UE 100 over a 3GPP access; and manage the MT-service information for a second SIM 160 of the multi-SIM UE 100 using the N3GPP access based on the on-going service on the 3GPP access of the first SIM 150 of the multi-SIM UE 100.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Accordingly the embodiments herein disclose a method for managing mobile terminated (MT)-service information to a multi-subscriber identity module (SIM) user equipment (UE) 100 over non-3rd generation partnership project (N3GPP) access in a wireless communication network. The method includes determining, by the multi-SIM UE 100, an on-going service on a first SIM 150 of the multi-SIM UE 100 over a 3GPP access; and managing, by the multi-SIM UE 100, the MT-service information for a second SIM 160 of the multi-SIM UE 100 using the N3GPP access based on the on-going service on the 3GPP access of the first SIM 150 of the multi-SIM UE 100.

Referring now to the drawings and more particularly to FIGS. 1 through 10, where similar reference characters denote corresponding features consistently throughout the figure, these are shown preferred embodiments.

FIG. 1 is a block diagram of the multi-SIM UE 100 for managing MT-service information over N3GPP access in a wireless communication network, according to the embodiments as disclosed herein.

Consider a wireless communication network comprising the multi-SIM UE 100 and an Access and Mobility Management Function (AMF) controller at the wireless communication network end. Consider that the multi-SIM UE 100 comprises two SIMS i.e., a first SIM 150 and a second SIM 160. In general, in the perspective of the multi-SIM UE 100, the first SIM 150 and the second SIM 160 may belong to a same device or to different networks. However, in the perspective of the wireless communication network the first SIM 150 and the second SIM 160 are considered as two separate user equipments (UEs). Therefore, the term first SIM 150 refers to a first UE comprising a first wireless protocol stack, the first SIM 150 card and a portion of an application layer. Similarly, the term second SIM 160 refers to a second UE comprising a second wireless protocol stack, the second SIM 160 card and a remaining portion of the application layer. Therefore, in the perspective of the wireless communication network the first SIM 150 can be referred to as the first UE 150 and the second SIM 160 can be referred to as the second UE 160.

Referring to the FIG. 1, the multi-SIM UE 100 is for example a mobile phone, a smart phone, Personal Digital Assistant (PDA), a tablet, a wearable device, or the like. The multi-SIM UE 100 includes a communicator 110, a memory 120, a processor 130, a mobile terminated (MT)-service management controller 140, the first SIM 150 and the second SIM 160.

In an embodiment, the communicator 110 is configured to enable communication between the various hardware elements of the multi-SIM UE 100.

The memory 120 can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 120 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In some examples, the memory 120 is configured to store larger amounts of information than the memory. In certain examples, a non-transitory storage medium may store data that can, over time, change (e.g., in Random Access Memory (RAM) or cache).

In an embodiment, the processor 130 is configured to execute various instructions stored in the memory 120.

In an embodiment, the MT-service management controller 140 is configured to determine an on-going service on the first SIM 150 of the multi-SIM UE 100 over the 3GPP access and manage the MT-service information for the second SIM 160 of the multi-SIM UE 100 using the N3GPP access based on the on-going service on the 3GPP access of the first SIM 150 of the multi-SIM UE 100.

In an embodiment, the MT-service management controller 140 is configured to manage the MT-service information for the second SIM 160 using the N3GPP access. For example, the MT-service management controller 140 is configured to receive a NOTIFICATION message from the AMF controller of the second SIM 160 over the N3GPP access for initiating a MT service on the second SIM 160 over the 3GPP access. The NOTIFICATION message includes information of a type of MT service to be initiated on the second SIM 160 over the 3GPP access. Further, the MT-service management controller 140 is configured to determine a priority of the type of service to be initiated over the 3GPP access of the second SIM 160 and a priority of the on-going service on the first SIM 150 over the 3GPP access and determine whether the priority of the type of service pending for the second SIM 160 over 3GPP access is higher than the priority of the on-going service on the first SIM 150. The type of service is indicated using one of a mobile terminated (MT) cause and a paging cause.

On determining that the priority of the type of service pending for the second SIM 160 over 3GPP access is higher than the priority of the on-going service on the first SIM 150 over 3GPP access, the MT-service management controller 140 is configured to trigger a service request or a registration request for the second SIM 160 with the AMF controller over a 3GPP access and move to a connected mode over the second SIM 160. On determining that the priority of the type of service pending for the second SIM 160 over 3GPP access is not higher than the priority of the on-going service on the first SIM 150 over 3GPP access, the MT-service management controller 140 is configured to send a NOTIFICATION RESPONSE message to the AMF controller over the N3GPP access indicating that the multi-SIM UE 100 is not intending to respond to the NOTIFICATION message for the second SIM 160. The second SIM 160 is in connection management (CM)-CONNECTED state for the N3GPP access and CM-IDLE or in radio receive control (RRC)_INACTIVE state for the 3GPP access.

In another embodiment, the MT-service management controller 140 is configured to manage the MT-service information for the second SIM 160 using the N3GPP access. For example, the MT-service management controller 140 is configured to automatically send a NAS message with paging filtering rules to the AMF controller of the second SIM 160 of the multi-SIM UE 100 over the N3GPP access. The paging filtering rules comprise at least one of a reject cause value, a timer value, a list of services for which the multi-SIM UE 100 wishes to receive paging over the 3GPP access, a list of services for which the multi-SIM UE 100 wishes to receive notification over the non-N3GPP access, a list of paging cause and services for which the multi-SIM UE 100 does not wish to receive paging over the 3GPPA, a list of paging cause and services for which the multi-SIM UE 100 does not wish to receive the notification over the N3GPPA. The paging filtering rules is determined based on the on-going service on the first SIM 150 of the multi-SIM UE 100.

Only dual SIM case is discussed but the proposed method is applicable to Multi universal subscriber identity module (USIM) case too.

Although the FIG. 1 shows the hardware elements of the multi-SIM UE 100 but it is to be understood that other embodiments are not limited thereon. In other embodiments, the multi-SIM UE 100 may include less or more number of elements. Further, the labels or names of the elements are used only for illustrative purpose and does not limit the scope of the invention. One or more components can be combined together to perform same or substantially similar function.

Figure 2A:
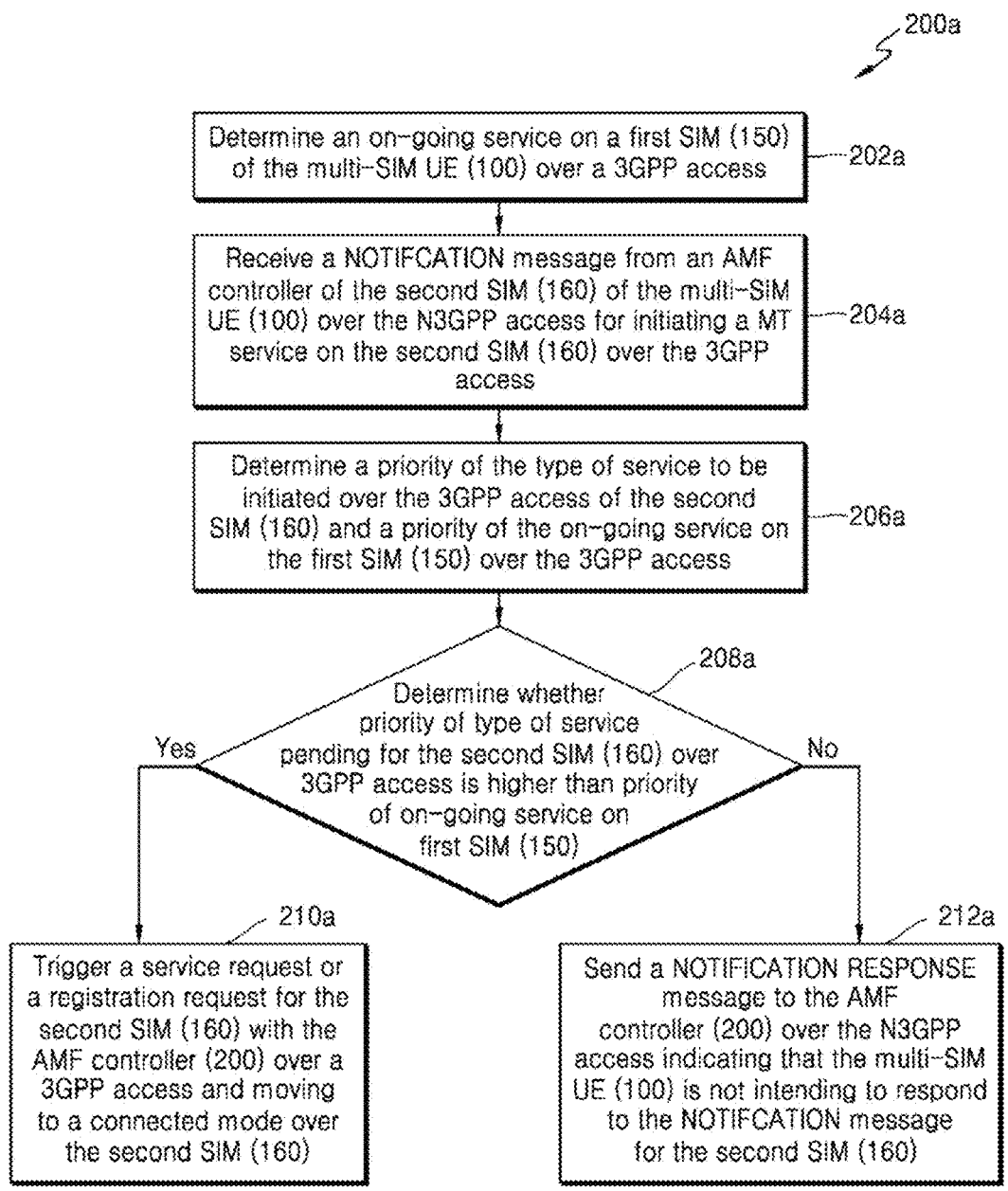
FIG. 2A is a flow chart illustrating a method for managing the MT-service information over the N3GPP access in the wireless communication network, according to the embodiments as disclosed herein.

FIG. 2A is a flow chart 200a illustrating a method for managing the MT-service information over the N3GPP access in the wireless communication network, according to the embodiments as disclosed herein.

Referring to the FIG. 2A, at step 202a, the multi-SIM UE 100 determines the on-going service on the first SIM 150 of the multi-SIM UE 100 over the 3GPP access. For example, in the multi-SIM UE 100 illustrated in the FIG. 1, the MT-service management controller 140 is configured to determine the on-going service on the first SIM 150 of the multi-SIM UE 100 over the 3GPP access.

At step 204a, the multi-SIM UE 100 receives the NOTIFICATION message from the AMF controller of the second SIM 160 of the multi-SIM UE 100 over the N3GPP access for initiating the MT service on the second SIM 160 over the 3GPP access. For example, in the multi-SIM UE 100 illustrated in the FIG. 1, the MT-service management controller 140 is configured to receive the NOTIFICATION message from the AMF controller of the second SIM 160 of the multi-SIM UE 100 over the N3GPP access for initiating the MT service on the second SIM 160 over the 3GPP access.

At step 206a, the multi-SIM UE 100 determines the priority of the type of service to be initiated over the 3GPP access of the second SIM 160 and the priority of the on-going service on the first SIM 150 over the 3GPP access. For example, in the multi-SIM UE 100 illustrated in the FIG. 1, the MT-service management controller 140 is configured to determine the priority of the type of service to be initiated over the 3GPP access of the second SIM 160 and the priority of the on-going service on the first SIM 150 over the 3GPP access.

At step 208a, the multi-SIM UE 100 determines whether the priority of type of service pending for the second SIM 160 over the 3GPP access is higher than priority of the on-going service on the first SIM 150. For example, in the multi-SIM UE 100 illustrated in the FIG. 1, the MT-service management controller 140 is configured to determine whether the priority of type of service pending for the second SIM 160 over the 3GPP access is higher than priority of the on-going service on the first SIM 150.

At step 210a, the multi-SIM UE 100 triggers the service request or the registration request for the second SIM 160 with the AMF controller over the 3GPP access and moves to the connected mode over the second SIM 160, on determining that the priority of type of service pending for the second SIM 160 over the 3GPP access is higher than priority of the on-going service on the first SIM 150. For example, in the multi-SIM UE 100 illustrated in the FIG. 1, the MT-service management controller 140 is configured to trigger the service request or the registration request for the second SIM 160 with the AMF controller over the 3GPP access and move to the connected mode over the second SIM 160, on determining that the priority of type of service pending for the second SIM 160 over the 3GPP access is higher than priority of the on-going service on the first SIM 150.

At step 212a, the multi-SIM UE 100 sends the NOTIFICATION RESPONSE message to the AMF controller over the N3GPP access indicating that the multi-SIM UE 100 is not intending to respond to the NOTIFICATION message for the second SIM 160, on determining that the priority of type of service pending for the second SIM 160 over the 3GPP access is not higher than priority of the on-going service on the first SIM 150. For example, in the multi-SIM UE 100 illustrated in the FIG. 1, the MT-service management controller 140 is configured to send the NOTIFICATION RESPONSE message to the AMF controller over the N3GPP access indicating that the multi-SIM UE 100 is not intending to respond to the NOTIFICATION message for the second SIM 160, on determining that the priority of type of service pending for the second SIM 160 over the 3GPP access is not higher than priority of the on-going service on the first SIM 150.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 2B:
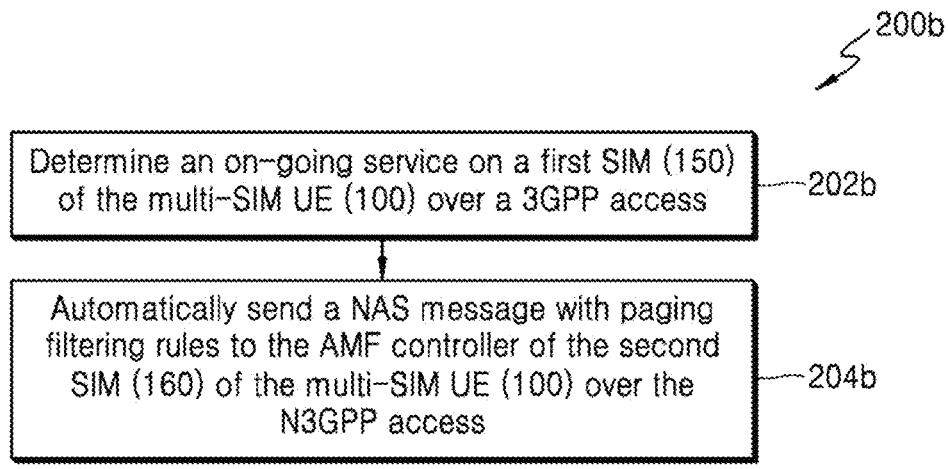
FIG. 2B is another flow chart illustrating the method for managing the MT-service information over the N3GPP access in the wireless communication network, according to the embodiments as disclosed herein.

FIG. 2B is another flow chart 200b illustrating the method for managing the MT-service information over the N3GPP access in the wireless communication network, according to the embodiments as disclosed herein.

Referring to the FIG. 2B, at step 202b, the multi-SIM UE 100 determines the on-going service on the first SIM 150 of the multi-SIM UE 100 over the 3GPP access. For example, in the multi-SIM UE 100 illustrated in the FIG. 1, the MT-service management controller 140 is configured to determine the on-going service on the first SIM 150 of the multi-SIM UE 100 over the 3GPP access.

At step 204b, the multi-SIM UE 100 automatically sends the NAS message with paging filtering rules to the AMF controller of the second SIM 160 of the multi-SIM UE 100 over the N3GPP access. For example, in the multi-SIM UE 100 illustrated in the FIG. 1, the MT-service management controller 140 is configured to automatically send the NAS message with paging filtering rules to the AMF controller of the second SIM 160 of the multi-SIM UE 100 over the N3GPP access.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 3:
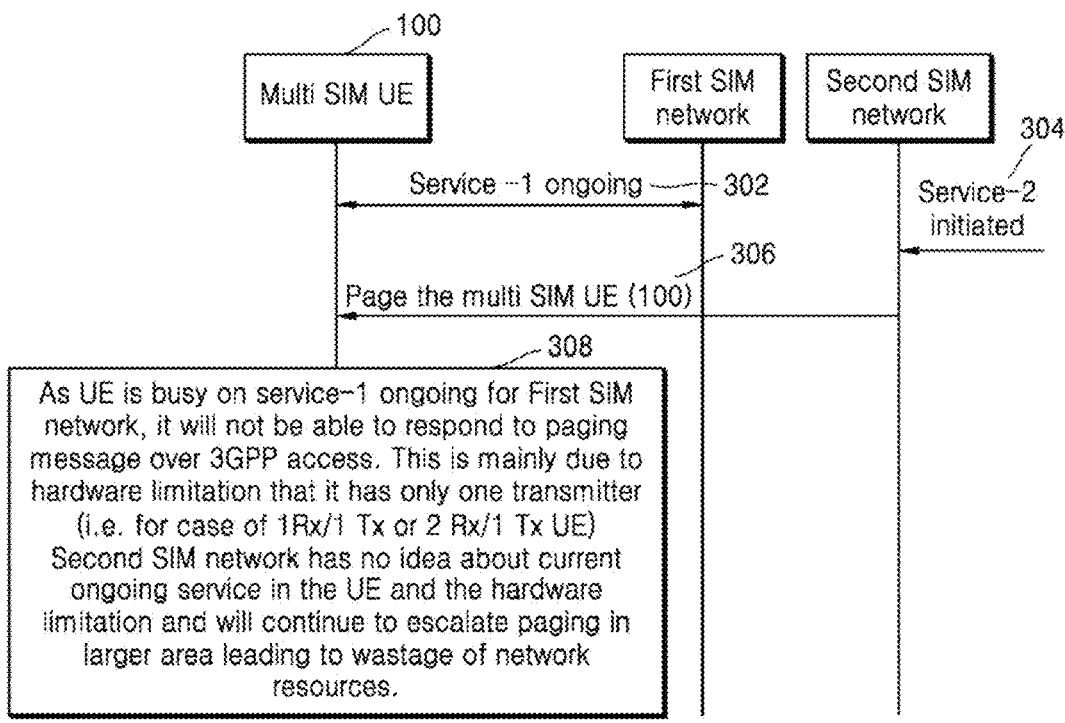
FIG. 3 is a signalling diagram illustrating a scenario of resources wastage as the multi-SIM UE 100 is unaware of a type of service pending for a second SIM 160, according to the prior art.

FIG. 3 is a signalling diagram illustrating a scenario of resources wastage as the multi-SIM UE 100 is unaware of the type of service pending for the second SIM 160, according to the prior art.

Referring to the FIG. 3, consider the multi-SIM UE 100 comprising a single receiver and a single transmitter or a dual receiver and single transmitter (in general Multi USIM UE). At step 302, the multi-SIM UE 100 is in connected mode using the service-1 on the first SIM 150. At step 306, the multi-SIM UE 100 receives paging from network for the second SIM 160 indicating a pending service (service-2) which is waiting to be initiated on the second SIM 160 over the 3GPPA. The multi-SIM UE 100 with single receiver and single transmitter will not be able to receive this paging message. The multi-SIM UE 100 with two receiver and single transmitter will be able to receive this paging message. At step 308, since the multi-SIM UE 100 is busy with the services on the first SIM 150, the multi-SIM UE 100 will not be able to respond to the paging message over the 3GPP access. The inability of the multi-SIM UE 100 to respond to the paging for the second SIM 160 while the service is ongoing on the first SIM 150 is mainly due to hardware limitation of the single transmitter. However, since the second SIM network is not aware about the hardware limitation of the single transmitter of the multi-SIM UE 100 and the ongoing services, the second SIM network will continue to escalate the paging in larger area leading to wastage of network resources.

Figure 4A:
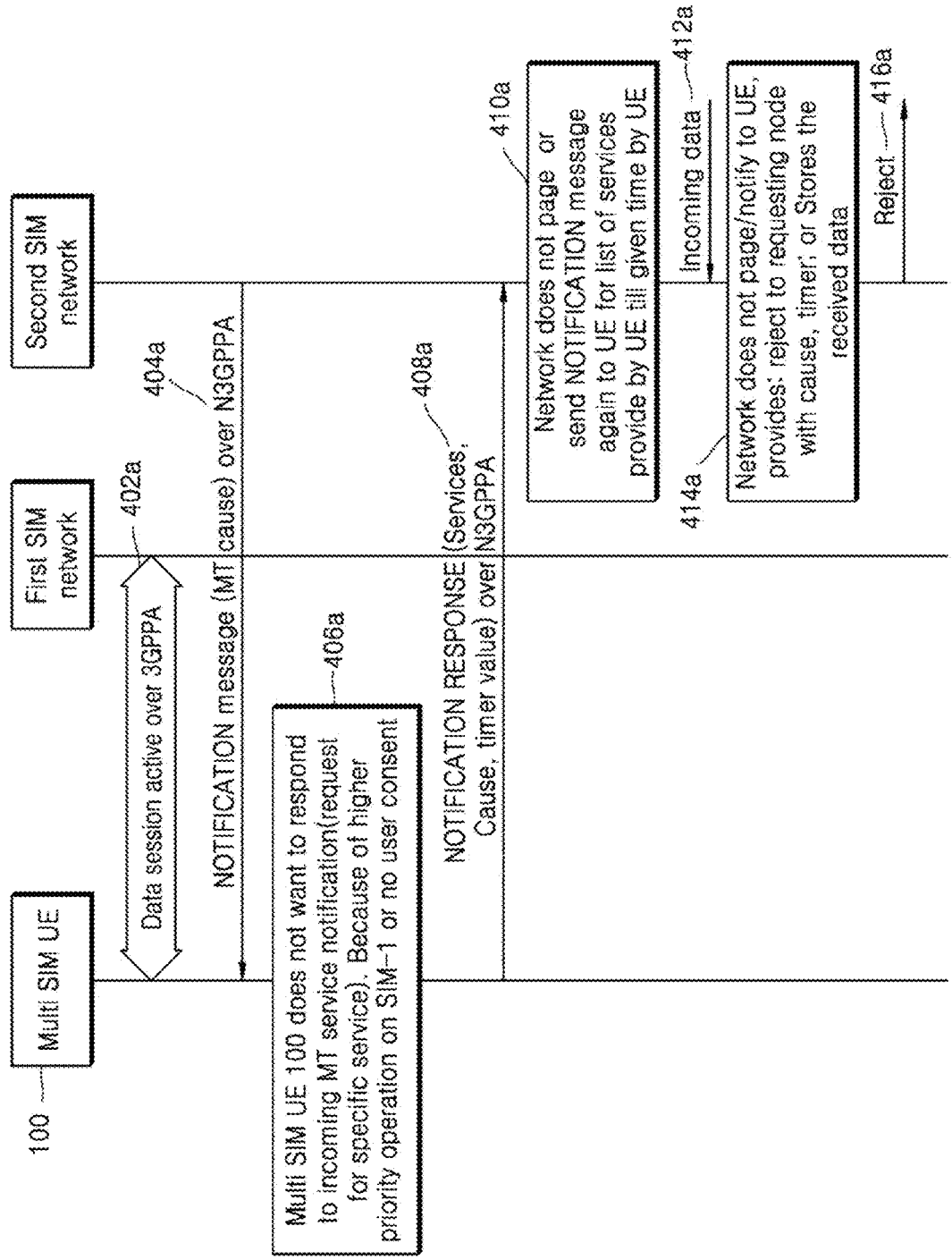
FIG. 4A is a signalling diagram illustrating a scenario of managing the MT service information received using a notification message (with MT cause) over the N3GPPA from a second SIM network, according to the embodiments as disclosed herein.

FIG. 4A is a signalling diagram illustrating a scenario of managing the MT service information received using a notification message (with MT cause) over the N3GPPA from the second SIM network, according to the embodiments as disclosed herein.

Referring to the FIG. 4A, at step 404a the multi-SIM UE (100) receives one of the notification message (with the MT cause) over the non-3GPP access (N3GPPA) or on reception of paging message over the 3GPP access (3GPPA) with the paging cause. At step 406a, the multi-SIM UE 100 determines that the current operation on the first SIM 150 is of higher priority when compared to the MT service pending to be received (or initiated) over the second SIM 160 then the multi-SIM UE 100 shall respond back with notification response message to the network over the N3GPPA, as shown in the step 408a. If the N3GPPA is in registered connected mode (in the case if the N3GPPA is not in the connected mode, then once the multi-SIM UE 100 enters in connected mode), the multi-SIM UE 100 can send the notification response message with the parameters (or information) indicated above), carrying one or all of the below information:
- The multi-SIM UE 100 is not in a situation to start the pending MT service or operation over the 3GPPA.
- The set of services on which the multi-SIM UE 100 is fine to receive notification (over the N3GPPA) or paging (over the 3GPPA). i.e. the multi-SIM UE 100 will initiate service request and get into connected mode over the 3GPPA for those services.
- A timer indicating the duration to which the multi-SIM UE 100 is not ready to accept the paging message over 3GPPA or notification message over the N3GPPA for the indicated services.
- Indication to the network that the multi-SIM UE 100 is not interested to listen to any MT data/signaling until further notice. In this case, the multi-SIM UE 100 is required to send a NAS message indicating to the network when it is fine to receive the MT data again.

Figure 4B:
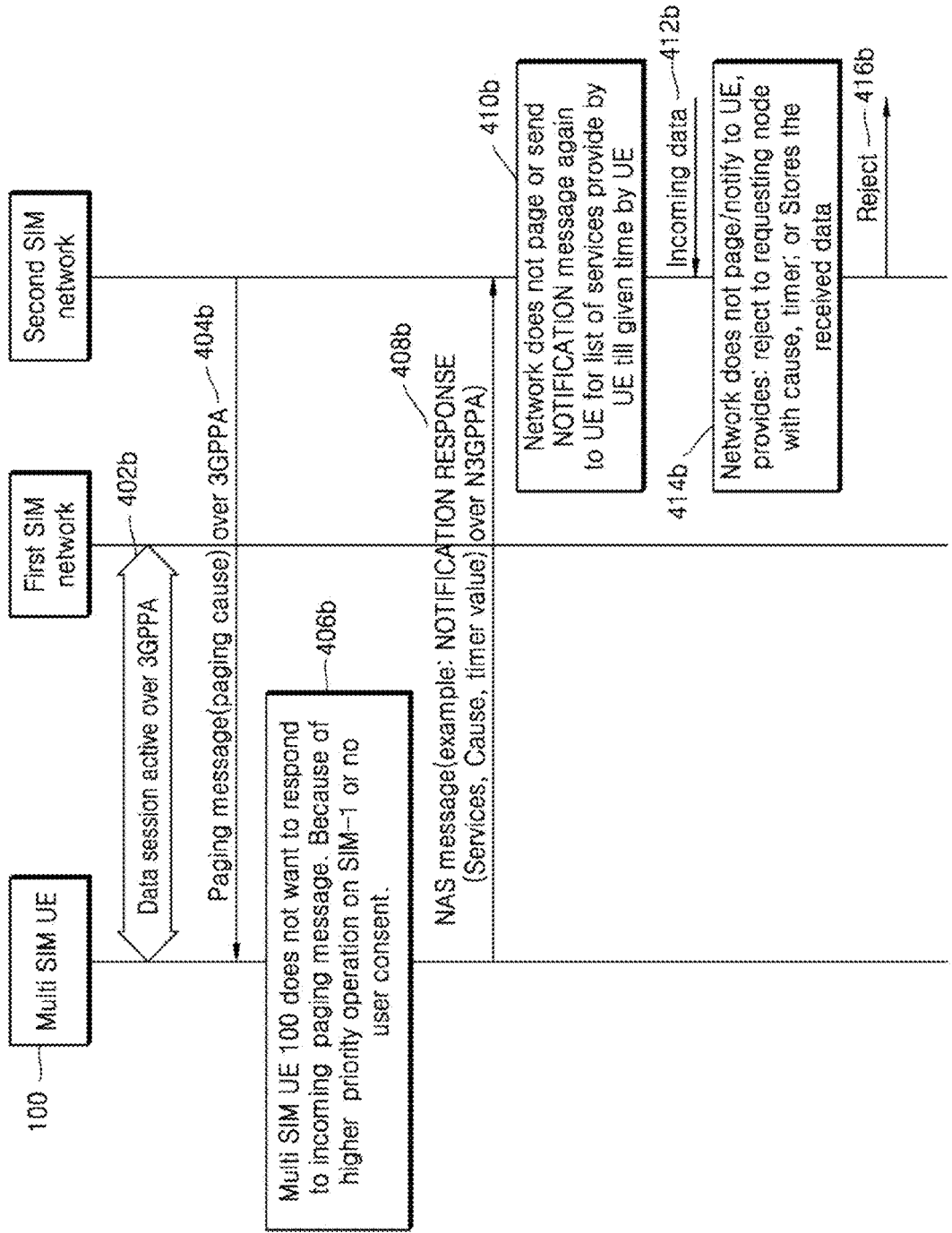
FIG. 4B is a signalling diagram illustrating a scenario of managing the MT service information received using a paging message over the 3GPPA from the second SIM network, according to the embodiments as disclosed herein.

FIG. 4B is a signalling diagram illustrating a scenario of managing the MT service information received using a paging message over the 3GPPA from the second SIM network, according to the embodiments as disclosed herein.

Referring to the FIG. 4B, at step 404b, the multi-SIM UE 100 receives paging message (over the 3GPP access) with the paging cause value (service type). Further, at step 406b, the multi-SIM UE 100 checks the priority of the ongoing service in the other SIM and based on USIM configuration or user preferences or both, if the multi-SIM UE 100 decides that current paging is not a priority compared to the service on other SIM, then the multi-SIM UE 100 shall send the NAS message to the network over N3GPP access (step 408b). In NAS message sent over the N3GPP access, the multi-SIM UE 100 can include reject cause value, a timer value and list of services for which the multi-SIM UE 100 wants to receive paging (over 3GPPA) or notification (over non-3GPP access) and/or list of paging cause/services for which the multi-SIM UE 100 does not want to receive paging (over 3GPPA) or notification (over non-3GPPA). Because of the NAS message the network will cease to send further paging (over 3GPP access)/notification messages (over non-3GPP access) to the multi-SIM UE 100 for the given transaction (optionally until the provided timer is expired).

Figure 5A:
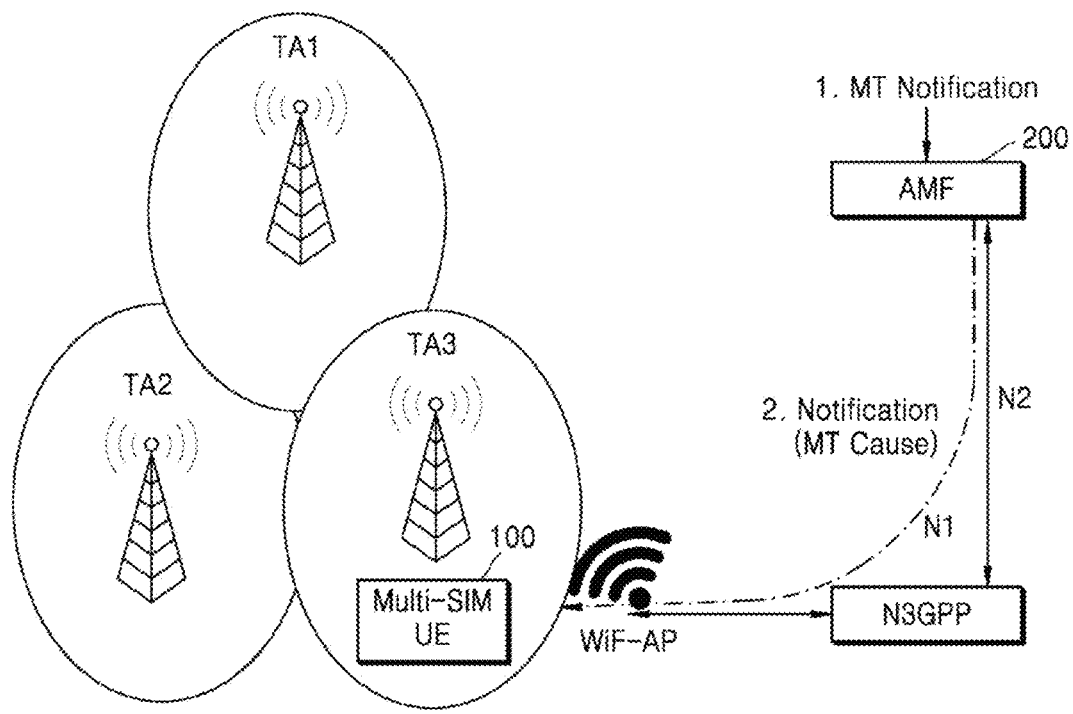
FIG. 5A is an example illustrating Notification (or NAS) message from an AMF sent over the N3GPP access (Wi-fi Access) to the multi-SIM UE 100 used for managing the MT service information, according to an embodiment as disclosed herein.

FIG. 5A is an example illustrating Notification (or NAS) message from the AMF sent over the N3GPP access (Wifi Access) to the multi-SIM UE 100 used for managing the MT service information, according to an embodiment as disclosed herein.

The 5G system same AMF will service both the 3GPP access and the non-3GPP Access in a same public land mobile network (PLMN). When the AMF receives downlink data for the 3GPP access, notification (or NAS) message from the AMF can be sent over the N3GPP access (Wifi Access) to the multi-SIM UE 100 when the N3GPPA CM state is 5GMM_REGISTERED and CM_CONNECTED (or otherwise) over the N3GPP access and CM state is IDLE over the 3GPPA.

Further, the notification message (or NAS message) can carry information to the multi-SIM UE 100, as to a kind of traffic/data/signaling is pending to be delivered to the multi-SIM UE 100 over the 3GPP access. The information can be called as the paging cause, service category, service category ID, application service category ID, MT cause, etc. In general, the information corresponds to the set of services/set of NAS or radio receive control (RRC) messages which are at the same priority level to the multi-SIM UE 100. With this information, the multi-SIM UE 100 understands that one of these sets of services/set of NAS or RRC messages is pending to be delivered to the multi-SIM UE 100 over the 3GPP access.

If notification message is coming on the N3GPPA (non-3GPP access) from operator of the first SIM 150, depending on current activity (or operation) on the second SIM 160 the multi-SIM UE 100 can make one of the following decisions based on the MT cause received in notification message:
- Respond to notification message with service request message over the 3GPP access of the first SIM 150 operator, In this case the multi-SIM UE 100 will suspend on the second SIM 160 for the 3GPPA part of operations or services i.e. RF is not provided to the SIM-2 stack.
- Neglect the notification message; or
- The multi-SIM UE 100's first SIM stack can respond back to operator of the first SIM 150 over the N3GPPA indicating the reasons for inability of initiating the service request over the 3GPPA because of higher priority operations on the second SIM 160 i.e. the multi-SIM UE 100 is busy and it cannot take the incoming service.

On reception of the notification message the multi-SIM UE 100 will respond to notification message with service request message over 3GPP access of first SIM 150 operator if the MT cause received indicates the MT traffic over first SIM 150 operator is of higher priority when compared to the second SIM 160 operation or the second SIM 160 is in idle or detached mode. In this case the second SIM 160's 3GPP access part of services is suspended. Suspension can be of two types one by indicating to the network or local but it's restricted to the 3GPP access.

On reception of notification message the multi-SIM UE 100 will not respond to notification message if the current operation on the second SIM 160 is of higher priority when compared to the one pending on the first SIM 150.

Figure 5B:
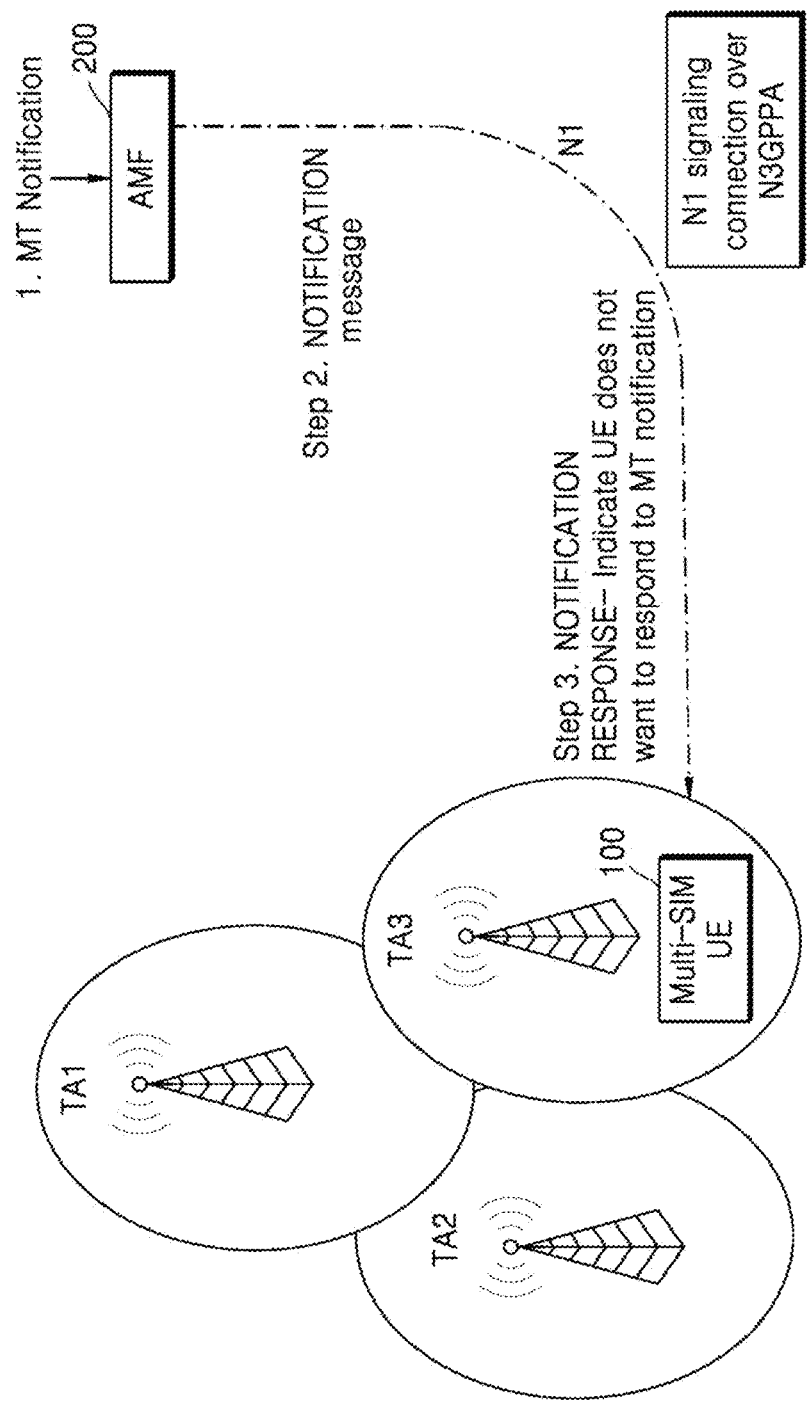
FIG. 5B is an example illustration in which N1 signaling connection over the N3GPPA from AMF to the multi-SIM UE 100 is used for managing the MT service information, according to an embodiment as disclosed herein.

FIG. 5B is an example illustration in which N1 signaling connection over the N3GPPA from AMF to the multi-SIM UE 100 is used for managing the MT service information, according to an embodiment as disclosed herein.

Referring to the FIG. 5B, in this approach the multi-SIM UE 100 whenever initiates a service on the first SIM 150, the multi-SIM UE 100 can indicate to the second SIM 160 operator on the N3GPPA:
1. whether the multi-SIM UE 100 can accept the MT paging or not optionally along with the timer 2. If the multi-SIM UE 100 can accept the paging or notification (over N3GPPA) then what kind of services the multi-SIM UE 100 can accept over SIM-2, optionally along with the timer.

The proposed method is applicable to both the cases when MUSIM UE is registered to single PLMN and also for different PLMNs. The terms first SIM 150/SIM-1 and the second SIM 160/SIM-2 indicate the respective protocol stack. In the proposed method, the terms notification, notification response are used. These names are just indicative and can be any NAS message or RRC message but the concept remains the same. The proposed method can be applied to MUSIM (multi USIM i.e. more than one USIM) UE also. The multi-SIM UE 100 will be receiving or sending the NAS message in the embodiment is possible only if the multi-SIM UE (100) is in registered state and CM-CONNECTED.

Figure 6:
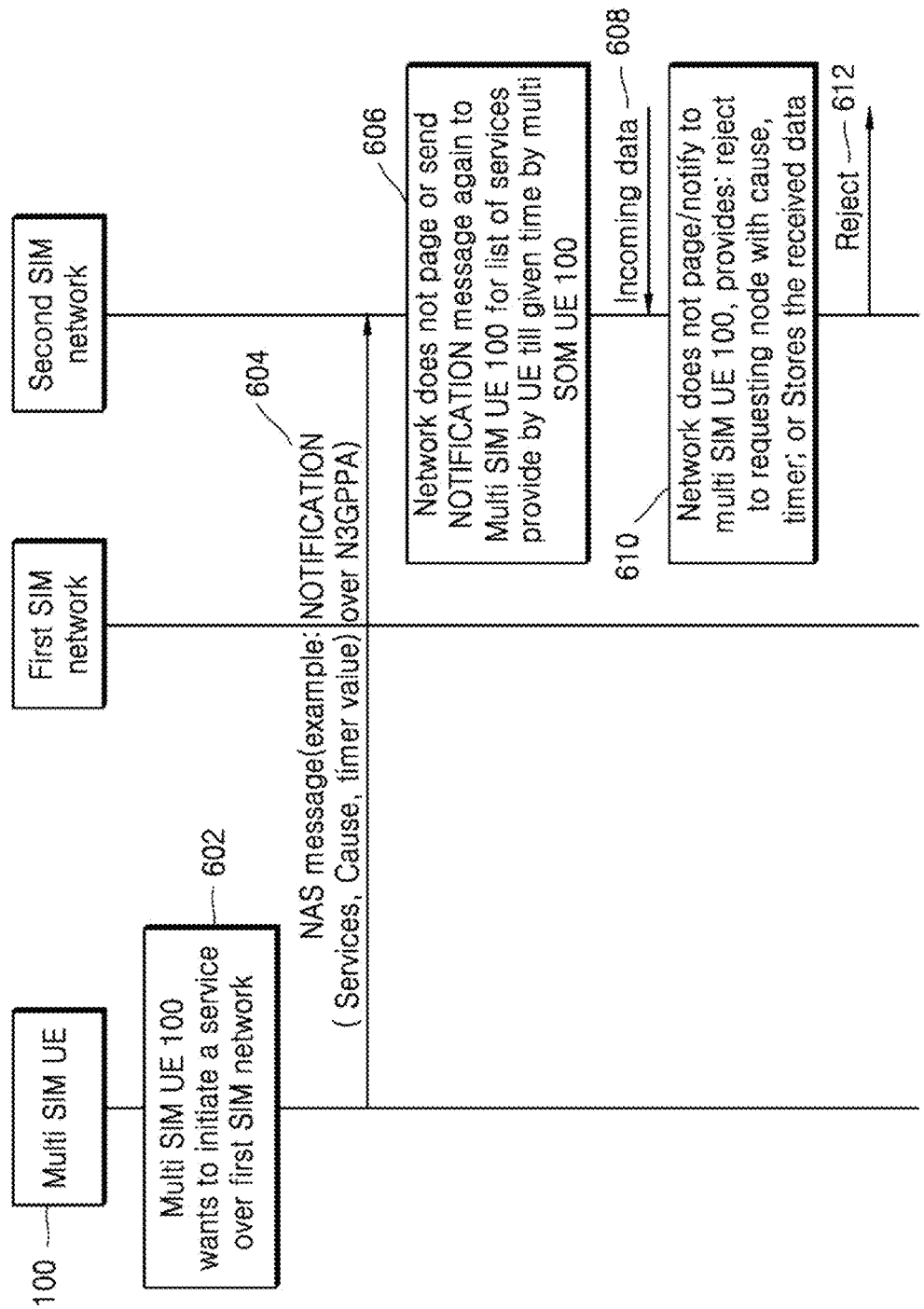
FIG. 6 is a signalling diagram illustrating scenario where the multi-SIM UE 100 automatically sends the NAS message with paging filtering rules to the AMF of the second SIM 160 of the multi-SIM UE 100 over the N3GPP access, according to an embodiment as disclosed herein.

FIG. 6 is a signalling diagram illustrating scenario where the multi-SIM UE 100 automatically sends the NAS message with paging filtering rules to the AMF controller of the second SIM 160 of the multi-SIM UE 100 over the N3GPP access, according to an embodiment as disclosed herein.

Referring to the FIG. 6, at step 602, consider that the multi-SIM UE 100 wants to initiate a service or operation over one SIM, then at step 604, the multi-SIM UE 100 shall send the NAS message to the network of other SIM over the non-3GPPA. In the NAS or message, the multi-SIM UE 100 can include reject cause value, a timer value and list of services for which UE wants to receive paging (over 3GPPA) or notification (over non-3GPP access) and/or list of paging cause/services for which the multi-SIM UE 100 does not want to receive paging (over 3GPPA) or notification (over non-3GPPA). The multi-SIM UE 100 can also explicitly indicate that it does not want to receive paging for all cases. Because of the NAS message, at step 606, the network will cease to send further paging (over 3GPPA)/NOTIFICATION (over N3GPPA) messages to the multi-SIM UE 100 (optionally until the provided timer is expired). Consider that the multi-SIM UE 100 has provided a timer value to the network indicating a duration for which the multi-SIM UE 100 is not ready to receive the MT notification i.e. paging in 3GPPA or notification message over N3GPPA (optionally for a subset of services). Now, if the multi-SIM UE (100) wants to change the timer value or stop this timer on the network side then UE shall send a NAS message again (over 3GPP or non-3GPP access) indicating to network the new timer value or to stop the timer.

When the multi-SIM UE 100 receives a paging message with paging cause (over 3GPPA) or NOTIFICATION message with MT cause (over N3GPPA) over SIM-2 operator, the multi-SIM UE 100 based on user consent or the multi-SIM UE 100 implementation based on priority of service which is incoming. The multi-SIM UE 100 can decide to abort the 3GPPA part of ongoing service or operation on SIM-1 network (which may be in connected mode). For which the multi-SIM UE 100 can indicate the same to the SIM-1 network. SIM-1 network will then suspend the ongoing service and move the multi-SIM UE 100 to IDLE or INACTIVE state. The MT cause or paging cause or like so terms used in the embodiment indicate the information provided to the multi-SIM UE 100 over one of the 3GPPA and the Non-3GPP access regarding the MT signalling or data pending over the 3GPPA. The MT signalling or data can be of one or more set of services or NAS signalling message pending to be delivered to the UE over 3GPPA.

In this embodiment the terms paging cause, MT cause or service(s) is the information which can be in the form of APN/DNN (i.e. PDU session ID), QCI, 5QI, packet filters, Slice ID, NS SAI, S-NSSAI or an ID which can represent the services of same priority or signalling message of same priority.

The message names used in the embodiment are just representative those indicates one of the NAS message and the RRC message.

In this embodiment where ever its indicated that timer value is provided to the network, in same situation if no timer value is provided to the network then network can consider as zero value and network can again page or send notification to the multi-SIM UE 100 after network implementation dependent time.

In this embodiment when the multi-SIM UE 100 indicates to the network with set of services for which the multi-SIM UE 100 does not want to be paged or notified then the network is allowed to page or notify the multi-SIM UE 100 for other services.

In this embodiment when UE indicates to network with set of services for which the multi-SIM UE 100 does want to be paged or notified then the network should not page or notify the multi-SIM UE 100 for other services.

In this embodiment when the multi-SIM UE 100 indicates to the network with set of services for which it does want to be paged, the multi-SIM UE 100 can also indicate to the network that the multi-SIM UE 100 does not want to be paged or notified for any MT signalling or data.

In this embodiment the term operation, service, set of services indicates a data packet of Protocol Data Unit (PDU) session (for example which can be represented by a service) or it can represent a signalling message.

In this embodiment the term operation, service, set of services indicates a downlink data packet of PDU session (for example which can be represented by a service) or it can represent a signalling message or it can be any procedure (or action) which is performed by the multi-SIM UE 100.

In this embodiment the explanation is considering the example as 5G but the proposed method is applicable to 4G technology with appropriate changes.

In this embodiment an indication (or information) is sent to the multi-SIM UE 100 by the network over the non-3GPP access. The information indicates type of signaling or data is pending to be delivered to the multi-SIM UE 100 over 3GPPA. Based on this information the multi-SIM UE (100) perform either of below:
1. The multi-SIM UE 100 suspends the 3GPPA part of other SIM operations or services ongoing based on user consent or UE configuration or USIM configuration. The suspension can be local in the multi-SIM UE 100 (without informing) the network or the multi-SIM UE 100 can indicate to the network whose operations are suspended using NAS message or AS message as discussed in this embodiment. Further the multi-SIM UE 100 sends the service request message (or any NAS message) on the 3GPPA of the network which provided the indication (or information) over N3GPPA.
2. The multi-SIM UE (100) decides to neglect the received incoming message.
3. The multi-SIM UE (100) can respond back to the network sending the information over N3GPPA, using the 3GPPA (for example using early data transmission mechanism defined in 3GPP) or N3GPPA that the multi-SIM UE 100 does not want to react to the information over the 3GPPA.

Further additional information may be provided indicating till what duration the multi-SIM UE 100 does not want to react over 3GPPA, for what list of services the multi-SIM UE 100 does not want to react over 3GPPA, for what list of services the multi-SIM UE 100 want to react over 3GPPA. The additional information can also indicate to the network that the multi-SIM UE 100 doesn't want to be paged or NOTIFIED for all incoming data or signaling over 3GPPA, in this case the multi-SIM UE 100 will have to indicate back to network when it's ready to accept incoming data or signaling over 3GPPA. Network acts based on this information received. Network will send the indication again to the UE only if the UE has indicated that it will react over 3GPPA—or—only for the services on which the multi-SIM UE 100 has indicated it will react over 3GPPA—or—it will wait to send the information to the multi-SIM UE 100 again till the timer the multi-SIM UE 100 provided expires—or—any combination of the 3 points above. The terminology react over 3GPPA means that UE will respond back with NAS message to the incoming notification or paging message over 3GPPA.

In this embodiment an indication (or information) is sent to the multi-SIM UE 100 by the network over the 3GPP access. The information indicates type of signaling or data is pending to be delivered to the multi-SIM UE 100 over 3GPPA. Based on this information the multi-SIM UE 100 perform either of below:
1. The multi-SIM UE 100 suspends the 3GPPA part of other SIM operations or services ongoing based on user consent or UE configuration or USIM configuration. The suspension can be local in the multi-SIM UE 100 (without informing) the network or it can indicate to the network whose operations are suspended using NAS message or AS message as discussed in this embodiment (same parameters as point 3 below).
2. The multi-SIM UE 100 decides to neglect the received incoming message.
3. The multi-SIM UE 100 can respond back to the network sending the information over N3GPPA, using 3GPPA (for example using early data transmission mechanism defined in 3GPP) or N3GPPA, that the multi-SIM UE 100 does not want to react to this information over 3GPPA. Further additional information is till what duration the multi-SIM UE 100 does not want to react over 3GPPA, for what list of services the multi-SIM UE 100 does not want to react over 3GPPA, for what list of services the multi-SIM UE 100 want to react over 3GPPA. The additional information can also indicate to the network that the multi-SIM UE 100 doesn't want to be paged or NOTIFIED for all incoming data or signaling over 3GPPA, in this case the multi-SIM UE 100 will have to indicate back to network when it's ready to accept incoming data or signaling over 3GPPA. Network acts based on this information received. Network will send the indication again to the multi-SIM UE 100 only if the multi-SIM UE 100 has indicated that it will react over 3GPPA—or—only for the services on which the multi-SIM UE 100 has indicated it will react over 3GPPA—or—it will wait to send the information to the multi-SIM UE 100 again till the timer it provided expires.

In this embodiment when it's said that the multi-SIM UE 100 will indicate set of services its fine to accept and initiate to network then those are set of services which are of higher or equal priority when compared to ongoing service on other USIM.

In this embodiment other SIM is one or more SIM's other than the SIM's network on which paging or notification message is received.

USIM or SIM's operator or network is the PLMN on which the respective USIM information is used to get registered with the network. i.e. it's a general term used to indicate a normal MUSIM case for example dual SIM UE may be registered to two operators one on SIM1 and another on SIM2. The respective registered networks are indicated as SIM1-network and SIM-2 network.

In this embodiment the term suspend can be interpreted as taking away RF from that particular stack which is suspended.

Figure 7:
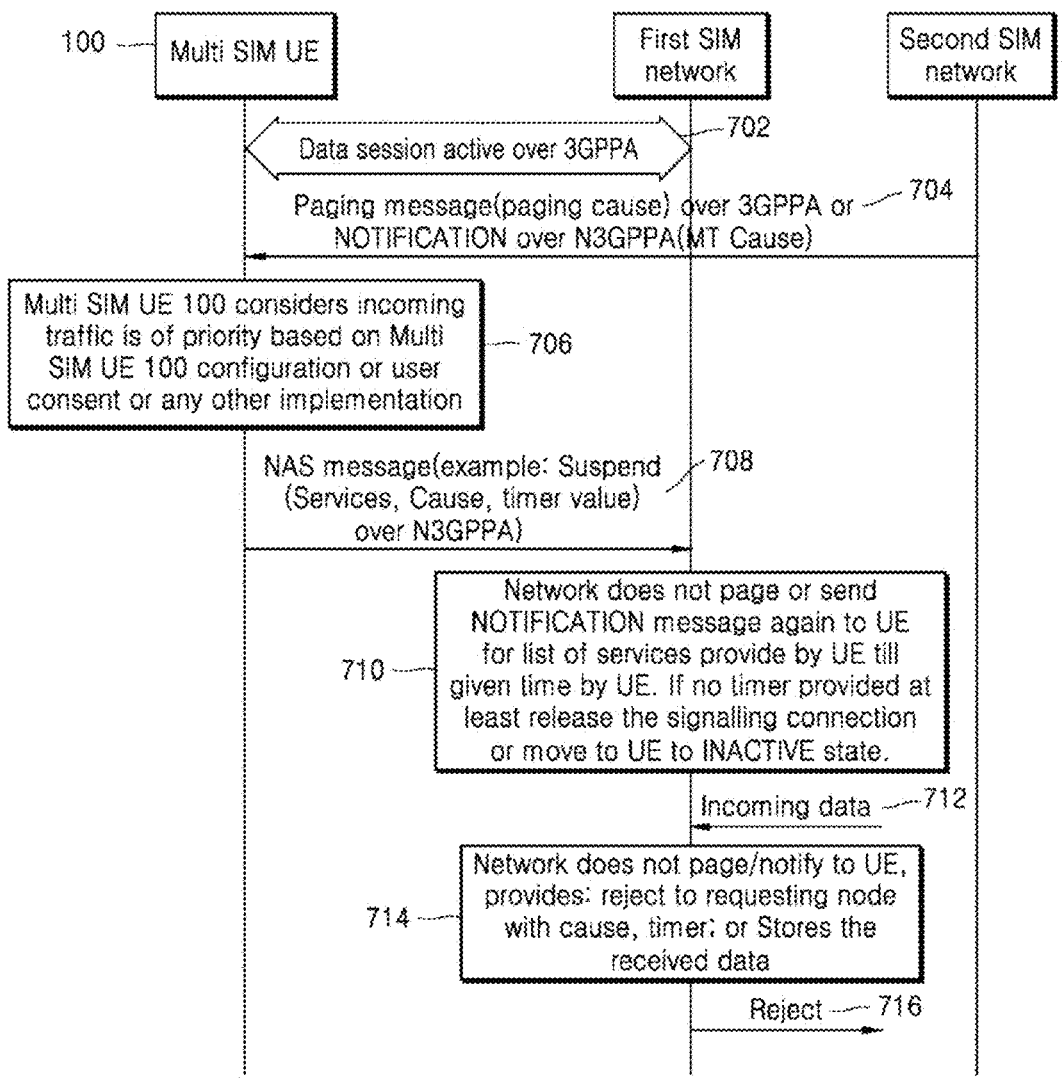
FIG. 7 is a signalling diagram illustrating scenario of suspending an active data connection in the multi-SIM UE 100 by the wireless communication network, according to an embodiment as disclosed herein.

FIG. 7 is a signalling diagram illustrating scenario of suspending the active data connection in the multi-SIM UE 100 by the wireless communication network, according to an embodiment as disclosed herein.

Referring to the FIG. 7, at step 704, consider that the multi-SIM UE 100 receives the paging message with the paging cause (over the 3GPPA) or the NOTIFICATION message with the MT cause (over N3GPPA).

At step 706, the multi-SIM UE 100 based on the user consent or the UE implementation based on the priority of service which is incoming decides to abort the 3GPPA part of the on-going service on the SIM-1 network which is in connected mode. For which the multi-SIM UE 100 can indicate the same to the SIM-1 network with a NAS message over N3 GPPA (as shown in the step 708). SIM-1 network will then suspend the on-going service and move the multi-SIM UE 100 to IDLE or INACTIVE state over 3GPPA. Network does not page or send NOTIFICATION message again to UE for list of services provided by UE till given time by UE. The network shall release the signalling connection and move the UE to IDLE state or INACTIVE state. (step 710). Further, at step 712 when there is incoming data, the SIM-1 network does not page/notify to the multi-SIM UE 100 (as shown in step 714) and at step 716 provides reject message to the requesting node with cause, timer; or stores the received data.

In this embodiment its discussed that the AMF sends NOTIFICATION message to the multi-SIM UE 100 over the N3GPP access with MT cause, the AMF can decide to send the NOTIFICATION message over the N3GPPA to the multi-SIM UE 100:
  a. if the multi-SIM UE 100 has indicated that the multi-SIM UE 100 will not respond to the paging message, (optionally for subset of services) over 3GPPA to the network using NAS or AS message. i.e. the UE is in suspended state over 3GPPA (optionally only for particular services).
  b. If the AMF knows that the UE is a MUSIM UE (or more accurately UE is a 1 Rx/Tx or 2 Rx/Tx) and due to which AMF knows that UE may not be able to respond to paging over 3GPPA. The AMF identifies that UE is a MUSIM UE based on information provided by UE in NAS/AS message or network storing this subscription information etc.

In this embodiment, the multi-SIM UE 100 can indicate in the NAS message or the AS message (like registration request or service request message) to the AMF for mandatorily sending notification message over the N3GPPA because the multi-SIM UE 100 will not be able to respond to paging over the 3GPPA. If the AMF accepts this request then the AMF can indicate back to the multi-SIM UE 100 in the NAS message or the AS message (like registration accept or service accept). With the accept indication from the AMF, the multi-SIM UE 100 will stop monitoring paging channel over the 3GPPA to receive mobile terminated (MT) services and the multi-SIM UE 100 will expect to receive all the pending MT service notification over N3GPPA and not through paging procedure on the 3GPPA. The mandatorily indicating the AMF to send the notification over N3GPPA by the multi-SIM UE 100 can also be implicitly understood by network when the multi-SIM UE 100 indicate to network to suspend the current ongoing services over 3GPPA and asks the network to release the resources i.e. RRC and NAS signaling connection (or move the UE into inactive state). In the NAS message, the multi-SIM UE 100 can indicate that the multi-SIM UE 100 does not want to receive paging (optionally for set of services and for particular duration of time). In this case too the multi-SIM UE 100 will stop monitoring paging messages for MT services.

Figure 8:
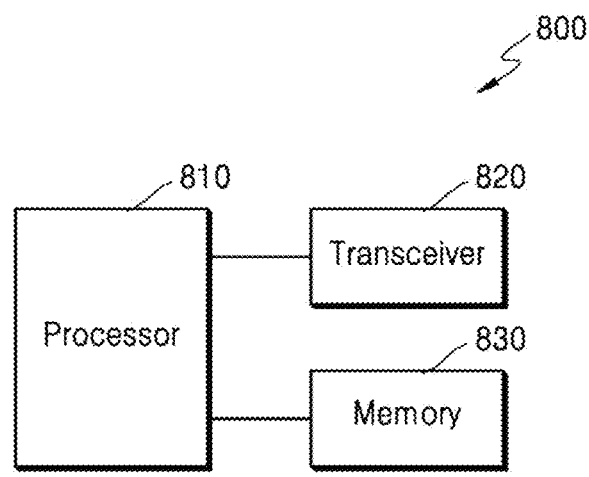
FIG. 8 schematically illustrates a Entity according to embodiments of the present disclosure.

FIG. 8 is a block diagram illustrating a base station according to an exemplary embodiment of the present disclosure.

Referring to the FIG. 8, the base station 800 may include a processor 810, a transceiver 820 and a memory 830. However, all of the illustrated components are not essential. The base station 800 may be implemented by more or less components than those illustrated in FIG. 8. In addition, the processor 810 and the transceiver 820 and the memory 830 may be implemented as a single chip according to another embodiment.

The aforementioned components will now be described in detail.

The processor 810 may include one or more processors or other processing devices that control the proposed function, process, and/or method. Operation of the base station 800 may be implemented by the processor 810.

The transceiver 820 may include a RF transmitter for up-converting and amplifying a transmitted signal, and a RF receiver for down-converting a frequency of a received signal. However, according to another embodiment, the transceiver 820 may be implemented by more or less components than those illustrated in components.

The transceiver 820 may be connected to the processor 810 and transmit and/or receive a signal. The signal may include control information and data. In addition, the transceiver 820 may receive the signal through a wireless channel and output the signal to the processor 810. The transceiver 820 may transmit a signal output from the processor 810 through the wireless channel.

The memory 830 may store the control information or the data included in a signal obtained by the base station 800. The memory 830 may be connected to the processor 810 and store at least one instruction or a protocol or a parameter for the proposed function, process, and/or method. The memory 830 may include read-only memory (ROM) and/or random access memory (RAM) and/or hard disk and/or CD-ROM and/or DVD and/or other storage devices.

Figure 9:
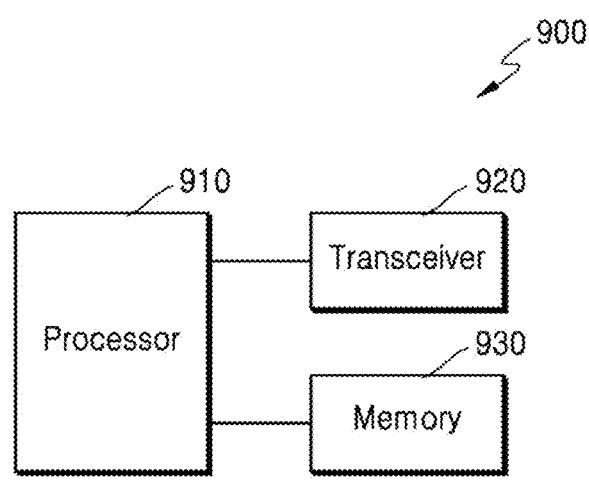
FIG. 9 illustrates a user equipment (UE) according to embodiments of the present disclosure.

FIG. 9 illustrates a user equipment (UE) according to embodiments of the present disclosure.

The multi-SIM UE 100 described above may correspond to the UE 900.

Referring to the FIG. 9, the UE 900 may include a processor 910, a transceiver 920 and a memory 930. However, all of the illustrated components are not essential. The UE 900 may be implemented by more or less components than those illustrated in FIG. 9. In addition, the processor 910 and the transceiver 920 and the memory 930 may be implemented as a single chip according to another embodiment.

The aforementioned components will now be described in detail.

The processor 910 may include one or more processors or other processing devices that control the proposed function, process, and/or method. Operation of the UE 900 may be implemented by the processor 910.

The transceiver 920 may include a RF transmitter for up-converting and amplifying a transmitted signal, and a RF receiver for down-converting a frequency of a received signal. However, according to another embodiment, the transceiver 920 may be implemented by more or less components than those illustrated in components.

The transceiver 920 may be connected to the processor 910 and transmit and/or receive a signal. The signal may include control information and data. In addition, the transceiver 920 may receive the signal through a wireless channel and output the signal to the processor 910. The transceiver 920 may transmit a signal output from the processor 910 through the wireless channel.

The memory 930 may store the control information or the data included in a signal obtained by the UE 900. The memory 930 may be connected to the processor 910 and store at least one instruction or a protocol or a parameter for the proposed function, process, and/or method. The memory 930 may include read-only memory (ROM) and/or random access memory (RAM) and/or hard disk and/or CD-ROM and/or DVD and/or other storage devices.

Figure 10:
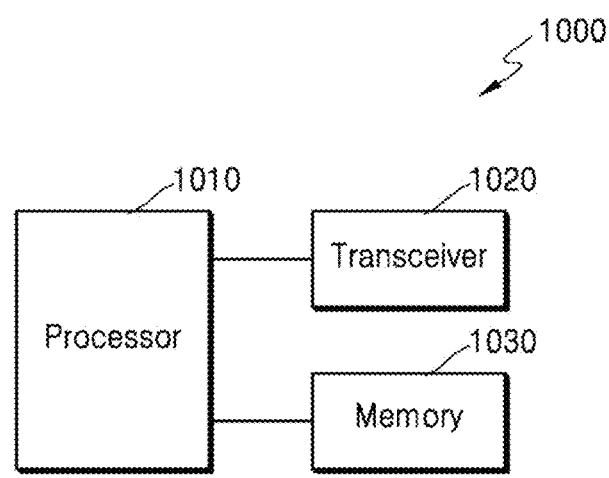
FIG. 10 schematically illustrates a core network entity according to embodiments of the present disclosure.

FIG. 10 schematically illustrates a core network entity according to embodiments of the present disclosure.

The AMF described above may correspond to the core network entity 1000.

Referring to the FIG. 10, the core network entity 1000 may include a processor 1010, a transceiver 1020 and a memory 1030. However, all of the illustrated components are not essential. The core network entity 1000 may be implemented by more or less components than those illustrated in FIG. 10. In addition, the processor 1010 and the transceiver 1020 and the memory 1030 may be implemented as a single chip according to another embodiment.

The aforementioned components will now be described in detail.

The transceiver 1020 may provide an interface for performing communication with other devices in a network. That is, the transceiver 1020 may convert a bitstream transmitted from the core network entity 1000 to other devices to a physical signal and covert a physical signal received from other devices to a bitstream. That is, the transceiver 1020 may transmit and receive a signal. The transceiver 1020 may be referred to as modem, transmitter, receiver, communication unit and communication module. The transceiver 1020 may enable the core network entity 1000 to communicate with other devices or system through backhaul connection or other connection method.

The memory 1030 may store a basic program, an application program, configuration information for an operation of the core network entity 1000. The memory 1030 may include volatile memory, non-volatile memory and a combination of the volatile memory and the non-volatile memory. The memory 1030 may provide data according to a request from the processor 1010.

The processor 1010 may control overall operations of the core network entity 1000. For example, the processor 1010 may transmit and receive a signal through the transceiver 1020. The processor 1010 may include at least one processor. The processor 1010 may control the core network entity 1000 to perform operations according to embodiments of the present disclosure.

The embodiments disclosed herein can be implemented through at least one software program running on at least one hardware device and performing network management functions to control the elements. The elements include blocks, elements, actions, acts, steps, or the like which can be at least one of a hardware device, or a combination of hardware device and software module.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by a user equipment (UE) in a wireless communication system, the method comprising:
   receiving, from an access and mobility management function (AMF) over non-3rd generation partnership project (3GPP) access, a notification message indicating 3GPP access;
   identifying that the UE is capable of multiple universal subscriber identity modules (multi-USIM) and that the UE is not able to initiate a service request procedure over the 3GPP access in response to the notification message due to a UE implementation constraint; and
   transmitting, to the AMF over the non-3GPP access, a notification response message indicating an inability of the UE to initiate the service request procedure.

2. The method of claim 1, wherein the initiation of the service request procedure is associated with transmission of a service request message to the AMF.

3. The method of claim 1, wherein the service request procedure is associated with a mobile terminated (MT) service.

4. The method of claim 1, further comprising:
   identifying that a service request procedure over the 3GPP access is ongoing.

5. The method of claim 1, wherein the notification message is related to a type of a service to be initiated over the 3GPP access.

6. A method performed by an access and mobility management function (AMF) in a wireless communication system, the method comprising:
   transmitting, to a user equipment (UE) over non-3rd generation partnership project (3GPP) access, a notification message indicating 3GPP access; and
   in case that the UE is capable of multiple universal subscriber identity modules (multi-USIM) and that the UE is not able to initiate a service request procedure over the 3GPP access in response to the notification message due to a UE implementation constraint, receiving, from the UE over the non-3GPP access, a notification response message indicating an inability of the UE to initiate the service request procedure.

7. The method of claim 6, wherein the initiation of the service request procedure is associated with reception of a service request message from the UE.

8. The method of claim 6, wherein the service request procedure is associated with a mobile terminated (MT) service.

9. A user equipment (UE) in a wireless communication system, the UE comprising:
   at least one processor configured to:
     receive, from an access and mobility management function (AMF) over non-3rd generation partnership project (3GPP) access, a notification message indicating 3GPP access,
     identify that the UE is capable of multiple universal subscriber identity modules (multi-USIM) and that the UE is not able to initiate a service request procedure over the 3GPP access in response to the notification message due to a UE implementation constraint, and
     transmit, to the AMF over the non-3GPP access, a notification response message indicating an inability of the UE to initiate the service request procedure.

10. The UE of claim 9, wherein the initiation of the service request procedure is associated with transmission of a service request message to the AMF.

11. The UE of claim 9, wherein the at least one processor is further configured to identify that a service request procedure over the 3GPP access is ongoing.

12. The UE of claim 9, wherein the service request procedure is associated with a mobile terminated (MT) service.

* * * * *